Jan. 2, 1962     G. NAWRATH ETAL     3,015,480
APPARATUS FOR MELTING POLYAMIDE SHREDS
Filed Sept. 18, 1957
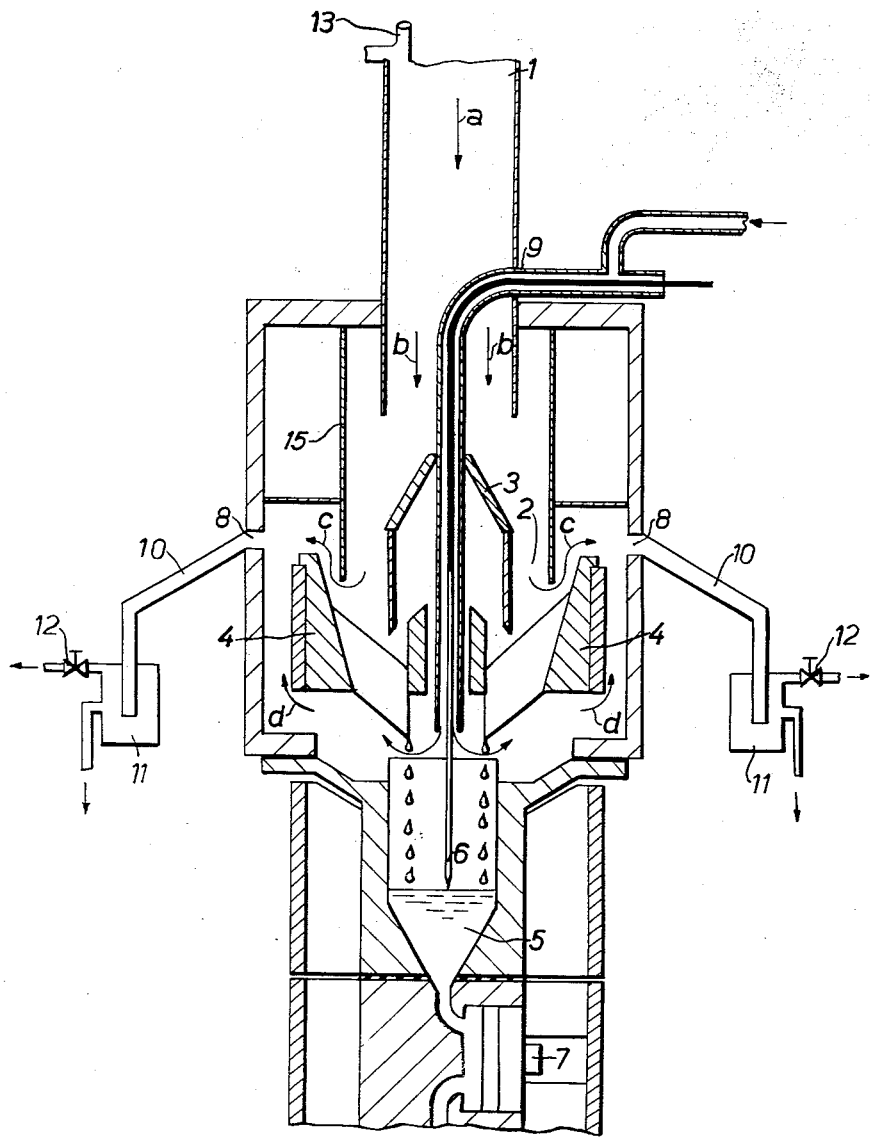
INVENTORS:
GÜNTHER NAWRATH, ROBERT SCHNEGG, OTTO HABERSTROH.
BY
*Burgess, Dinklage & Sprung*
ATTORNEYS

3,015,480
APPARATUS FOR MELTING POLYAMIDE SHREDS
Günter Nawrath, Robert Schnegg, and Otto Haberstroh, Dormagen, Germany, assignors to Farbenfabriken Bayer Aktiengesellschaft, Leverkusen, Germany, a corporation of Germany
Filed Sept. 18, 1957, Ser. No. 684,786
Claims priority, application Germany Sept. 20, 1956
1 Claim. (Cl. 263—11)

The present invention relates to the melting of polyamide shreds for the production of yarns, filaments, ribbons and the like. More particularly it relates to a melting process and apparatus for polyamide shreds.

The melting of polyamide shreds presents numerous difficulties, since in the melting of these organic filament forming compositions decomposition may occur at the melting temperature so that the viscosity is raised and other properties affected. Since it is known that large differences in the tensile strength and in the dyeing affinity of the yarns obtained occur, it was necessary to devise methods of melting in which such defects are avoided.

It is an object of the present invention to provide an improved melting process for polyamide shreds. A further object is the provision of an improved melting apparatus for the melt spinning of filaments from organic filament forming compositions. Still further objects will become apparent as the following specification proceeds.

In the melt-spinning of polyamides, it is known to use shreds which are supplied to a melting surface of any desired form, for example a melting grid or a melting assembly consisting of radially arranged heated ribs.

In these methods the melt is withdrawn and spun at a speed approximately equal to the melting speed. It is also known to effect the melting of polyamide shreds in an atmosphere of an inert oxygen-free gas, such as nitrogen.

We have found that if the melting process is to be carried out reliably, considerable importance is to be attached to the method of supplying and discharging the inert protective gas. According to the invention, the polyamide shreds are flushed in the direction of their feed to the melting surface with a pure protective gas and in addition the dripping melt is swept by a stream of protective gas, and the protective gas is permitted to discharge rapidly from the system by providing a plurality of discharge apertures in the vicinity of the melting position.

Particularly when melting shreds of the polyamide of caprolactam, considerable advantages are obtained by using the process of the invention. The protective gas, for example nitrogen, takes up lactam and water vapour in the melting chamber and quickly discharges these vapours through the heated discharge tubes. Moreover, any cyclic fractions of low molecular weight which are still present, as well as products of cracking, are completely removed from the melting chamber due to the rapid discharge of the protective gas and thus are no longer able to cause spinning break-downs and irregularities in the quality of the thread.

The main advantage of the process according to the invention consists in that it is also possible to spin shreds which are still moist, i.e. shreds with a water content up to 10%. It is therefore not absolutely necessary for the shreds to be dried to a very low water content, which is of advantage in that the slow drying of the shreds can be dispensed with and the damage to the shreds always associated with the drying, even when carefully carried out in vacuo, is avoided. Moist shreds provide a melt which becomes homogeneous much more quickly and at considerably lower temperatures than shreds which have been subjected to a long drying process.

In order to more clearly define the present invention, reference is made to the following detailed description taken in the connection with the accompanying illustration which is a diagrammatic, side elevational view of an apparatus for melt spinning according to the invention.

In the accompanying drawing, number 1 represents the down tube filled with shreds. The shreds are introduced in the direction of the arrow $a$ through the down tube into the melting chamber 2, where they travel over the hood or dome 3 and fall on to the radially arranged melting ribs or bars 4. The shreds are melted on these bars and the melt drips off the bottom ends of the melting bars into the sump 5. The level of the melt in the sump is controlled by the contact pin 6. The melt is extracted from the sump by the pump 7.

The protective gas is supplied through the mass of shreds through a feed pipe 13 in the direction of the arrows $b$. Where the shreds still contain considerable amounts of moisture, this is removed from the melting chamber in the direction of the arrows $c$ by way of the discharge openings 8. A stream of dry gas enters the melt chamber underneath the melting surface through the pipe 9 and leaves the melt chamber in the direction of the arrows $d$, likewise by way of the concentrically arranged discharge openings 8.

The flow in the direction of arrow $c$ is accomplished, without interference with flow of solid matter, by the use of a baffle 15, preferably cylindrical and encircling hood 13. In this instance baffle 15 is coaxial with tube 1 and extends the path of gas and shreds into the grids 4. The shreds being heavier are projected forward while the lighter, moisture laden gas will be drawn up and around the end of baffle 15 as indicated by arrow $c$. Such moisture therefore will not cool or otherwise interfere with the function of grids 4, and the inclusion of the contaminating moisture in the polyamide as bubbles or defects, is prevented.

Arranged at the discharge openings 8 are pipes 10 which are closed at the outer end by a liquid of adjustable level which is located in the vessels 11. The pressure of the protective gas in the melting chamber can be arbitrarily and uniformly adjusted by means of the valves 12.

It is surprising that the rapid discharge of the protective gas from the melting chamber through a plurality of symmetrically arranged discharge openings, as provided according to the invention, has a very favourable influence on the consistency of the melt viscosity. The constant melt viscosity and also the removal of cyclic polymers and cracking products give a considerably improved spinning reliability and enables the formation of threads which are free from irregularities and nodules. Moreover, the number of thread breakages during spinning is considerably reduced. The improvement in the quality of the thread facilitates processing and avoids defects in the complete appearance of the textile products on knitting and dyeing.

By adjustment of the valves 12, the gas pressure inside the melting chamber can be adjusted as required, it being possible to maintain the gas pressure at a value which is only slightly above atmospheric pressure. By observing the bubbles discharging in the vessel 11, it is readily possible to control the uniform discharge of gas from all outlet pipes.

If wet shreds are processed according to the invention, the rapid discharge of the water vapour nevertheless provides a dry melt in which the otherwise deleterious effect of water vapour, which causes an increase in the lactam content in the melt, is not noticeable. Nevertheless, the residual water vapour which remains leads to uniformity in the viscosity of the melt which, in contrast to melts obtained from dry shreds, does not increase. This is also a consequence of the low internal temperatures which can be used according to the invention. As previously mentioned, the melts constantly freed from additions of lactam, water, cracking products and the like are very easily homogenised, so that excessive melting temperatures are not required to render the melt homogeneous.

We claim:

Apparatus for the treatment of polyamide material comprising a chamber having a central upper inlet to admit shredded polyamide and extending thereinto, a heating and melting grid below said inlet to receive said polyamide material, a hood within said chamber to direct said polyamide material onto said grid, a sump to receive said melted polyamide, outlets in said chamber side wall for the withdrawal of gas from said chamber, a baffle about said hood to form a path in the direction of said outlets for the removal of moisture entrained with said polyamide material prior to exposure to said grids, a centrally disposed downwardly directed conduit within said hood and terminating below said grid to discharge inert gas in a path directed at said outlets and transverse to the direction of flow of polyamide whereby said polyamide is rid of moisture before melting and cleansed before deposition into said pump.

References Cited in the file of this patent
UNITED STATES PATENTS

| | | |
|---|---|---|
| 2,810,630 | Herele | Oct. 22, 1957 |
| 2,869,848 | Dickie et al. | Jan. 20, 1959 |